United States Patent [19]

Pulley et al.

[11] 4,234,555

[45] Nov. 18, 1980

[54] REMOVAL OF URANIUM FROM AQUEOUS HF SOLUTIONS

[75] Inventors: Howard Pulley, West Paducah; Steven F. Seltzer, Paducah, both of Ky.

[73] Assignee: The United States of America as represented by the United States Department of Energy, Washington, D.C.

[21] Appl. No.: 920,525

[22] Filed: Jun. 29, 1978

[51] Int. Cl.³ .......................... G21F 9/12; C02F 1/62
[52] U.S. Cl. ................................ 423/484; 210/682; 252/301.1 R; 423/483; 423/488; 423/11
[58] Field of Search ................ 423/6, 11, 12, 258, 423/490, 489, 483, 488, 484; 210/38 C; 252/301.1 R

[56] References Cited

U.S. PATENT DOCUMENTS

| | | | |
|---|---|---|---|
| 2,885,258 | 5/1959 | Bain | 423/6 |
| 2,901,314 | 8/1959 | Vavalides | 423/6 |
| 3,937,783 | 2/1976 | Wamser et al. | 423/11 |

*Primary Examiner*—Deborah L. Kyle
*Attorney, Agent, or Firm*—James E. Denny; Stephen D. Hamel; Fred O. Lewis

[57] ABSTRACT

This invention is a simple and effective method for removing uranium from aqueous HF solutions containing trace quantities of the same. The method comprises contacting the solution with particulate calcium fluoride to form uranium-bearing particulates, permitting the particulates to settle, and separating the solution from the settled particulates. The $CaF_2$ is selected to have a nitrogen surface area in a selected range and is employed in an amount providing a calcium fluoride/uranium weight ratio in a selected range. As applied to dilute HF solutions containing 120 ppm uranium, the method removes at least 92% of the uranium, without introducing contaminants to the product solution.

10 Claims, No Drawings

REMOVAL OF URANIUM FROM AQUEOUS HF SOLUTIONS

BACKGROUND OF THE INVENTION

This invention was made in the course of, or under, a contract with the U.S. Department of Energy. It relates broadly to methods for the removal of uranium from aqueous hydrogen fluoride (HF) containing the same. More particularly, it relates to a method for effecting removal of trace amounts of uranium without introducing additional impurities to the product solution.

This invention was developed in response to a need for a simple but effective method for decreasing the uranium content of a large volume of by-product aqueous hydrofluoric acid contaning uranium in the parts-per-million range. The acid solution comprised about 20 wt-% HF and 76 ppm uranium (uranium species in solution not known). Sale of the solution on the open market required that its uranium concentration be decreased below 10 ppm by some technique which would not introduce additional impurities into the product solution.

An attempt was made to decrease the uranium content of the solution by passing it over amorphous carbon maintained at 350°-450° C. This decreased the uranium content by only 64%. In another approach, the solution was passed through an anion exchange column of the hydroxide type. This decreased the uranium concentration by only 32%. Various other removal techniques were considered but rejected as impractical.

Various publications describe the adsorption of uranium from solutions by selective adsorption. The following is an example of such a publication: Minhai Dai and Shaw-Chii Wu, "Adsorption of Uranium from Dilute Aqueous Solution on Inorganic Adsorbents," *Separation Science*, 10(5), pp. 633-638 (1975). That paper described recommends adsorbing uranium with a mixture of aluminum hydroxide, ferric hydroxide, and activated carbon. It also describes experiments conducted with various alkaline earth oxides, hydroxides, and sulfates as adsorbents.

OBJECTS OF THE INVENTION

Accordingly, it is an object of this invention to provide a novel method for decreasing the uranium content of aqueous hydrofluoric acid containing trace amounts of uranium in solution.

It is another object to provide a simple and effective method for decreasing the uranium content of a uranium-bearing aqueous HF solution without introducing a contaminant into the product solution.

Other objects will be made evident hereinafter.

SUMMARY OF THE INVENTION

This invention may be summarized as being a method of decreasing the uranium content of an aqueous HF solution containing uranium, said method comprising mixing particulate calcium fluoride with said solution to form uranium-bearing particulates; permitting said particulates to sediment from said solution; and separating the resulting solution from the sedimented particulates.

BACKGROUND OF THE INVENTION

This invention is generally applicable to the recovery of uranium from aqueous HF solutions containing the same. It is based on our finding that intimately contacting such solutions with particulate $CaF_2$ and then sedimenting the particulates effects removal of much of the uranium. That is, uranium is carried down out of solution by the sedimented $CaF_2$ particles. The resulting solution then is separated from the sedimented, uranium-bearing particulates by any suitable technique. The mechanism by which the uranium is carried down is not yet well understood.

So far as is known, this process has not been reported previously. It is clear from the very low solubility of $CaF_2$ in aqueous solutions that the well-known common-ion effect is not involved here. If the uranium is in solution as $UF_4$ and no ionization has occurred, then the solubility-product principle would not be governing the carry-down of uranium. If the uranium is present as $UO_2F_2$, the solubility of this species is too high to account for the carry-down of uranium when present in trace quantities.

EXAMPLE I

The invention was tested by mixing selected quantities of particulate $CaF_2$ in six 0.200-liter samples of an aqueous HF solution containing 120 ppm uranium. The solution comprised 20 wt-% HF. The $CaF_2$ powder was acid-grade fluorspar, manufactured by Allied Chemical Corporation. This powder had a nitrogen surface area of 1.6 $m^2/g$ (based on the well-known B.E.T. measurement). Tyler-sieve data for the powder were as follows: 45% of the powder passed through a 325-mesh screen and 15% was retained by the screen; 27% was retained on a 200-mesh screen; 9% was retained on a 100-mesh screen; and 4% was retained on a 65-mesh screen. Each of the samples containing particulate $CaF_2$ was stirred at room temperature for an hour. Following stirring, the resulting slurries were either filtered promptly or the supernate was separated by decanting. The resulting solutions were analyzed for uranium by gamma-spectrometry and for calcium by atomic absorption.

The accompanying table shows the $CaF_2$-to-uranium weight ratios employed in each of the six tests, together with the results obtained. It will be noted that removal of 50% of the uranium was accomplished at a $CaF_2/U$ ratio of 8 and that removal of 92% of the uranium was accomplished at ratios exceeding 37. As shown, the product solutions contained very little calcium,—only 9 ppm if the solution was not filtered, and less than 0.2 ppm if it was filtered. Thus, the process was found to remove uranium effectively while avoiding contamination of the product solution.

| Sample No. | Lbs $CaF_2$ per 13,500 Gal. Solution | $CaF_2/U$ by Weight | Initial U Conc., ppm | Final U Conc., ppm | U Removal, % | Final $Ca^{++}$ Conc., ppm |
| --- | --- | --- | --- | --- | --- | --- |
| 1 | 56 | 4 | 120 | 72 | 40 | <0.2 |
| 2 | 84 | 6 | 120 | 71 | 41 | <0.2 |
| 3 | 112 | 8 | 120 | 60 | 50 | <0.2 |
| 4* | 112 | 8 | 120 | 59 | 51 | 9 |
| 5 | 500 | 37 | 120 | 10 | 92 | <0.2 |

-continued

| Sample No. | Lbs CaF$_2$ per 13,500 Gal. Solution | CaF$_2$/U by Weight | Initial U Conc., ppm | Final U Conc., ppm | U Removal, % | Final Ca$^{++}$ Conc., ppm |
|---|---|---|---|---|---|---|
| 6 | 1000 | 74 | 120 | 10 | 92 | <0.2 |

*Sample 4 was allowed to stand overnight before decanting. All other samples were filtered before analysis.

EXAMPLE II

A 67,000-pound batch of aqueous 20%-HF solution containing 74 ppm uranium was admitted to a railroad tank car which previously had been used to recover uranium in accordance with this invention. The rubber-linked tank contained a heel of CaF$_2$/U slurry remaining from the previous recovery operation. The tank car was provided with means for sparging with air.

With the sparging means energized, approximately 400 pounds of particulate CaF$_2$ (identified in Example I) was added to the solution to provide a total CaF$_2$/U weight ratio of 159 to 1. After three days of air agitation and then four hours of sedimentation (both conducted at room temperature), the solution was analyzed. The analysis was as follows: HF, ~20 wt-%, uranium, 7 ppm; calcium, >0.2 ppm. Following analysis, the solution was decanted for sale.

As indicated above, this method for recovery of uranium has significant advantages. For example, it entails comparatively simple process operations and requires only readily available equipment. Again, uranium removal is effected without introducing a contaminant into the product solution. Furthermore, a wide variety of CaF$_2$ powders may be employed, such as powders having nitrogen surface areas in the range of from about 1 to 200 m$^2$/g. The method is believed effective for reducing the uranium content of both dilute and concentrated aqueous HF solutions containing a trace amount of uranium. By "trace amount" is meant in the range of from a few ppm to thousands of ppm. In general, appreciable uranium carry-down may be obtained if the CaF$_2$/U weight ratio is in the range of from about 8 to 75.

It will be understood that the process parameters cited in Examples I and II, above, are not necessarily the optimum. For example, even higher percentages of uranium might have been removed if the runs had been conducted with (a) higher-surface-area CaF$_2$, (b) a tank having a more suitable geometry with respect to mixing, or (c) more efficient mixing means—e.g., a propeller-type mixer. Given the teachings herein, one versed in the art will be able to determinne the preferred process parameters (e.g., CaF$_2$ powder surface areas, CaF$_2$/U weight ratios) for a given application of this invention by merely routine experimentation, as by testing on a laboratory scale.

The foregoing examples are provided for the purpose of illustration only, and it will be understood that the scope of the invention is to be interpreted in terms of the following claims.

What is claimed is:

1. The method of decreasing the uranium content of an aqueous HF solution containing uranium to provide a product aqueous HF solution of increased purity, said method comprising:
   mixing particulate calcium fluoride with said solution to form uranium-bearing particulates,
   permitting said particulates to sediment from said solution, and
   separating the resulting aqueous HF solution from the settled particulates.

2. The method of claim 1 wherein said calcium fluoride is mixed with said solution in an amount providing a calcium fluoride-to-uranium weight ratio in the range of from about 8 to 75.

3. The method of claim 1 wherein said calcium fluoride has a nitrogen surface area in the range of from about 1 to 200 m$^2$/g.

4. The method of claim 1 wherein said resulting solution is separated by filtration.

5. The method of claim 1 wherein said resulting solution is separated by decanting.

6. The method of decreasing the uranium content of an aqueous HF solution containing a trace amount of uranium, said method comprising:
   mixing said solution with particulate calcium fluoride to provide a calcium fluoride-to-uranium weight ratio in the range of from about 8 to 75, said calcium fluoride having a nitrogen surface area in the range of from about 1 to 200 m$^2$/g, to form uranium-bearing particulates, permitting said particulates to settle out of solution, and selectively recovering the resulting aqueous HF solution.

7. The method of claim 6 wherein said supernate is recovered by decanting.

8. The method of claim 6 wherein said supernate is recovered by filtration.

9. The method of claim 6 wherein the mixing and settling-out operations are conducted at room temperature.

10. The method of decreasing the uranium content of an aqueous HF solution containing uranium without substantially altering the fluoride content thereof, said method comprising:
    mixing particulate calcium fluoride with said solution to form uranium-bearing particlates,
    permitting said particulates to sediment from said solution, and
    separating the resulting aqueous HF solution from the settled particulates.

* * * * *